US012756268B2

(12) United States Patent
Sallitt et al.

(10) Patent No.: US 12,756,268 B2
(45) Date of Patent: Oct. 6, 2026

(54) VOICE COIL MOTOR WITH MONOLITHIC BEARING AND POLE PIECE COMPONENTS

(71) Applicant: Thorlabs, Inc., Newton, NJ (US)

(72) Inventors: Christopher E. Sallitt, Newton, NJ (US); Avery Turley, Mooresville, NC (US)

(73) Assignee: Thorlabs, Inc., Newton, NJ (US)

(*) Notice: Subject to any disclaimer, the term of this patent is extended or adjusted under 35 U.S.C. 154(b) by 183 days.

(21) Appl. No.: 18/424,079

(22) Filed: Jan. 26, 2024

(65) Prior Publication Data

US 2024/0258895 A1 Aug. 1, 2024

Related U.S. Application Data

(60) Provisional application No. 63/441,622, filed on Jan. 27, 2023.

(51) Int. Cl.

| | |
|---|---|
| ***H02K 7/08*** | (2006.01) |
| ***H02K 1/02*** | (2006.01) |
| ***H02K 33/00*** | (2006.01) |
| ***H02K 33/02*** | (2006.01) |

(52) U.S. Cl.

CPC ................. *H02K 7/08* (2013.01); *H02K 1/02* (2013.01); *H02K 33/00* (2013.01); *H02K 33/02* (2013.01)

(58) Field of Classification Search

CPC ........ H02K 33/02; H02K 33/04; H02K 33/06; H02K 33/08; H02K 33/10; H02K 7/08

See application file for complete search history.

(56) References Cited

U.S. PATENT DOCUMENTS

| | | | |
|---|---|---|---|
| 3,733,500 A * | 5/1973 | Mushrush .............. | H02K 33/02 310/17 |
| 5,099,158 A | 3/1992 | Stuart et al. | |
| 7,550,880 B1 * | 6/2009 | Pusl ....................... | H02K 33/06 310/15 |

(Continued)

FOREIGN PATENT DOCUMENTS

| | | | |
|---|---|---|---|
| EP | 0918392 A1 * | 5/1999 | ......... H02K 41/0356 |
| JP | S5485312 A | 7/1979 | |

OTHER PUBLICATIONS

Kleinert (EP 0918392 A1) English Translation (Year: 1999).*

(Continued)

*Primary Examiner* — Tulsidas C Patel
*Assistant Examiner* — Robert E Mates
(74) *Attorney, Agent, or Firm* — Myers Wolin, LLC

(57) ABSTRACT

A voice coil motor including: a magnet; a coil; a bobbin supporting a winding of the coil and arranged coaxially with and radially outside of the magnet; a bearing housing including a first part of a linear bearing; a monolithic structure including a pole piece housing and a second part of the linear bearing; wherein the pole piece housing includes a sidewall, closed and open ends, and is arranged coaxially with and radially outside of the bobbin; the closed end is attached to the magnet; the bearing housing and an end of the bobbin are fixed relative to a common structure; the pole piece housing and the bearing housing are arranged to cause the first and second parts of the linear bearing mechanism to engage such that when a current is applied to the coil, the pole piece housing moves relative to the common structure.

15 Claims, 7 Drawing Sheets

(56) References Cited

U.S. PATENT DOCUMENTS

| | | | | |
|---|---|---|---|---|
| 2001/0030123 | A1* | 10/2001 | Fu | C23C 14/35 204/192.15 |
| 2005/0212363 | A1 | 9/2005 | Okubo | |
| 2006/0225985 | A1* | 10/2006 | Dimig | H01F 13/006 192/84.1 |
| 2006/0266967 | A1* | 11/2006 | Miura | H02K 5/04 251/129.15 |
| 2017/0317571 | A1 | 11/2017 | Kim et al. | |
| 2021/0376708 | A1 | 12/2021 | De Benedictis et al. | |

OTHER PUBLICATIONS

Extended European search report with search opinion issued by the European Patent Office for International Patent Application No. 24152626.8-1002, dated Jun. 26, 2024.

Communication pursuant to Article 94(3) EPC issued by The European Patent Office for European Patent Application No. 24152626.8, dated Apr. 1, 2026.

* cited by examiner

VOICE COIL MOTOR WITH MONOLITHIC BEARING AND POLE PIECE COMPONENTS

CROSS REFERENCE TO RELATED APPLICATIONS

This application claims the benefit of U.S. Provisional Patent Application No. 63/441,622 filed on Jan. 27, 2023. The disclosure of U.S. Provisional Patent Application No. 63/441,622 is hereby incorporated by reference.

TECHNICAL FIELD

The present disclosure generally relates to voice coil motors, and more particularly to a voice coil motor with a monolithic structure having both a bearing component and a magnetic pole piece component.

BACKGROUND

A voice coil motor (VCM) is a non-commutated electric motor design. The traditional design approach as shown in FIG. 1 consists of a non-conductive "bobbin" or coil holder which is wound with conductive wire. A pair or single magnetically conductive pole piece components are attached to a permanent magnet. The pole pieces are configured about the magnet's poles in such a way as to provide a pathway for the magnetic flux to be concentrated where it is most effective. Applying either direct or alternating current through the windings of the bobbin produces a secondary magnetic field. The interaction between two magnetic fields provides useful mechanical force output. This force output can be linear or radial depending upon the design, geometry and arrangement the two components with interacting magnetic fields.

Traditional voice coil motor designs utilize soft iron assemblies which are manufactured independent of the bearing mechanism. As shown in FIG. 2, a high-permeability soft iron material is typically utilized to maximize the efficiency of the motor through improved magnetic flux and thus, a stronger permanent magnetic field within the pole piece assembly. For example, iron has a relative permeability of about 5,000 when it is about 99.8% pure, and the relative permeability of soft iron is about 200,000 when it is 99.95% pure. Most contact-based bearing mechanisms utilize hardened high-carbon steel or stainless steel to maximize accuracy and lifetime. The typical materials utilized for these bearing mechanisms do not produce as strong as a permanent magnetic field due to their diminished magnetic properties (relative permeability less than 100). This bearing material requirement often limits the ability for a design to be conceived where the bearing mechanism is an integral part of the pole piece housing.

Some existing devices have been found that conjoin a bearing mechanism and the pole piece assembly using more than one component. These devices typically utilize a ring permanent magnet in place of a solid permanent magnet so that the bearing can be nested within the center aperture of the magnet. This existing attempted improvement offers space savings versus conventional designs which had completely separated bearing mechanisms and pole piece assemblies. One of the drawbacks to this existing technique is that there is reduced magnetic flux and thus lower potential force output of the motor due to the use of a ring magnet versus a solid magnet. In addition, the nested ring magnet/bearing design requires a very compact linear bearing and appropriate ring magnet to work. Permanent ring magnets are not readily manufactured in as many varieties as permanent solid cylindrical magnets, limiting design flexibility. The compact linear bearings utilized are also low performance devices when compared to other bearing designs currently available which are non-compatible with this approach.

Existing related technology sacrifices space, precision, and performance due to the wasted space and mass of the extra bearing, motor, and hardware components.

Therefore, there is a long-felt need to design a more space efficient version of a traditional voice coil motor to fit into an ultra-compact linear translation stage's footprint. Furthermore, there are long-felt needs to maximize the force output of the bearing mechanism within the available space; to lower device costs through a reduction in mechanical hardware; to lower manufacturing costs due to reduction in required machined components; to maximize the overall device's acceleration, deceleration, velocity, load capacity, and thermal handling through an optimized power-to-weight ratio of the electromechanical device; and to use the minimal number of components to avoid performance losses due to assembly misalignments and unnecessary manufacturing tolerances.

SUMMARY

According to an embodiment of the present disclosure, a voice coil motor's pole piece is combined with a contact bearing's inner or outer raceways into a singular, monolithic component. This novel design allows for extremely compact VCM motorized bearing assemblies and devices to be designed, due to the space savings achieved. Improvements to electromechanical device efficiency can be realized in several unique ways when applying this concept. The reduced mass of the singular, monolithic component versus traditional pole piece/bearing configurations improves the force-to-weight ratio of the device. The space saved can be partly or wholly utilized to increase the force output of the motor by increasing the number of conductive windings.

The monolithic design and manufacturing process, results in lower costs through a reduction in required mechanism components. The potential for higher performance of the bearing mechanism exists due to a reduction in unwanted, off-axis angular and orthogonal deviations, inherent to the unique design configuration and required manufacturing process.

An embodiment of the present disclosure provides a voice coil motor including: a magnet; a coil; a bobbin configured to support a winding of the coil, the bobbin being arranged coaxially with and radially outside of the magnet; a bearing housing including a first part of a linear bearing mechanism; a monolithic structure including a pole piece housing and a second part of the linear bearing mechanism; wherein the pole piece housing includes a closed end, an open end and a sidewall, the sidewall of the pole piece housing is arranged coaxially with and radially outside of the bobbin; wherein the closed end of the pole piece housing is attached to a pole of the magnet to provide a concentrated magnetic field; wherein the bearing housing and an end of the bobbin that faces away from the closed end of the pole piece housing are fixed relative to a common structure; and wherein the pole piece housing and the bearing housing are arranged to cause the first and second parts of the linear bearing mechanism to engage such that when a current is applied to the coil, the pole piece housing moves relative to the common structure.

DETAILED DESCRIPTION

Figure 1:
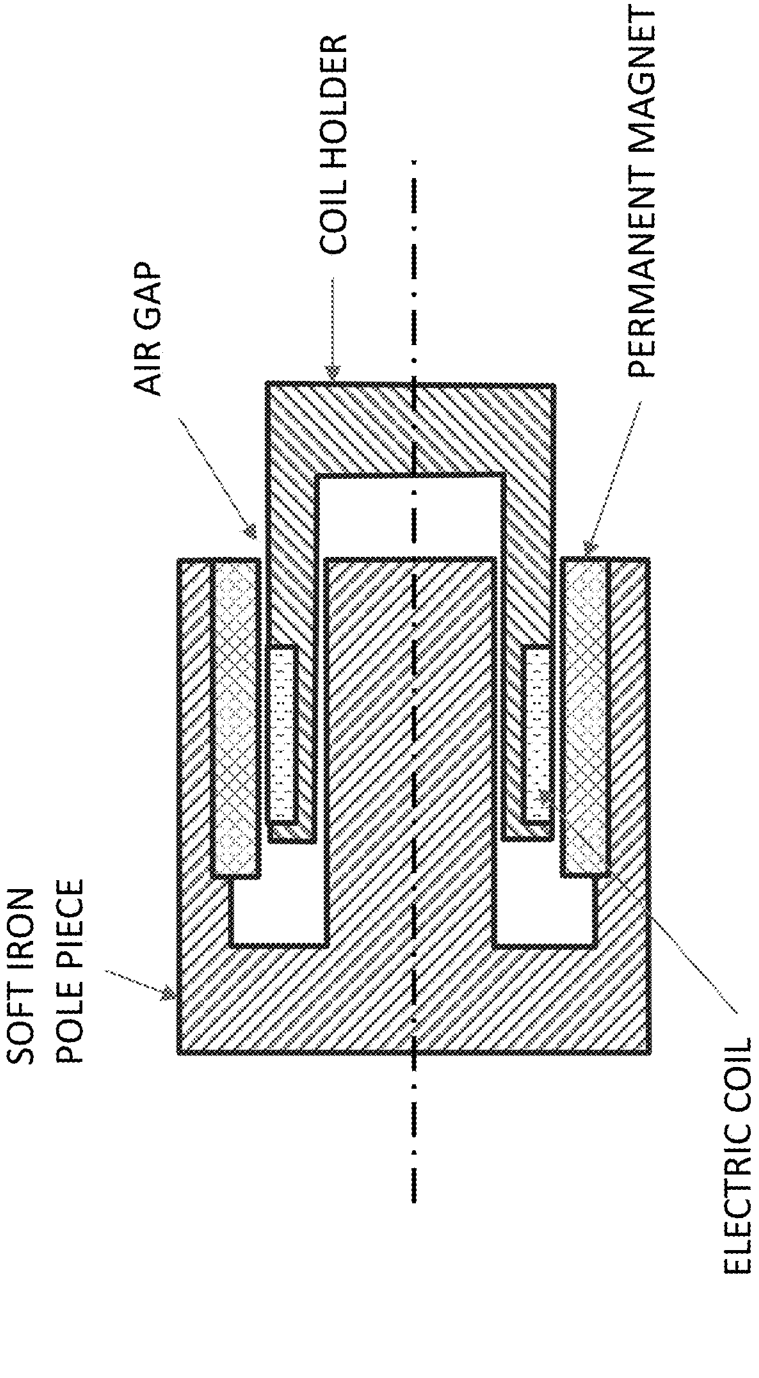
FIG. 1 shows a typical linear voice coil design.
Figure 2:
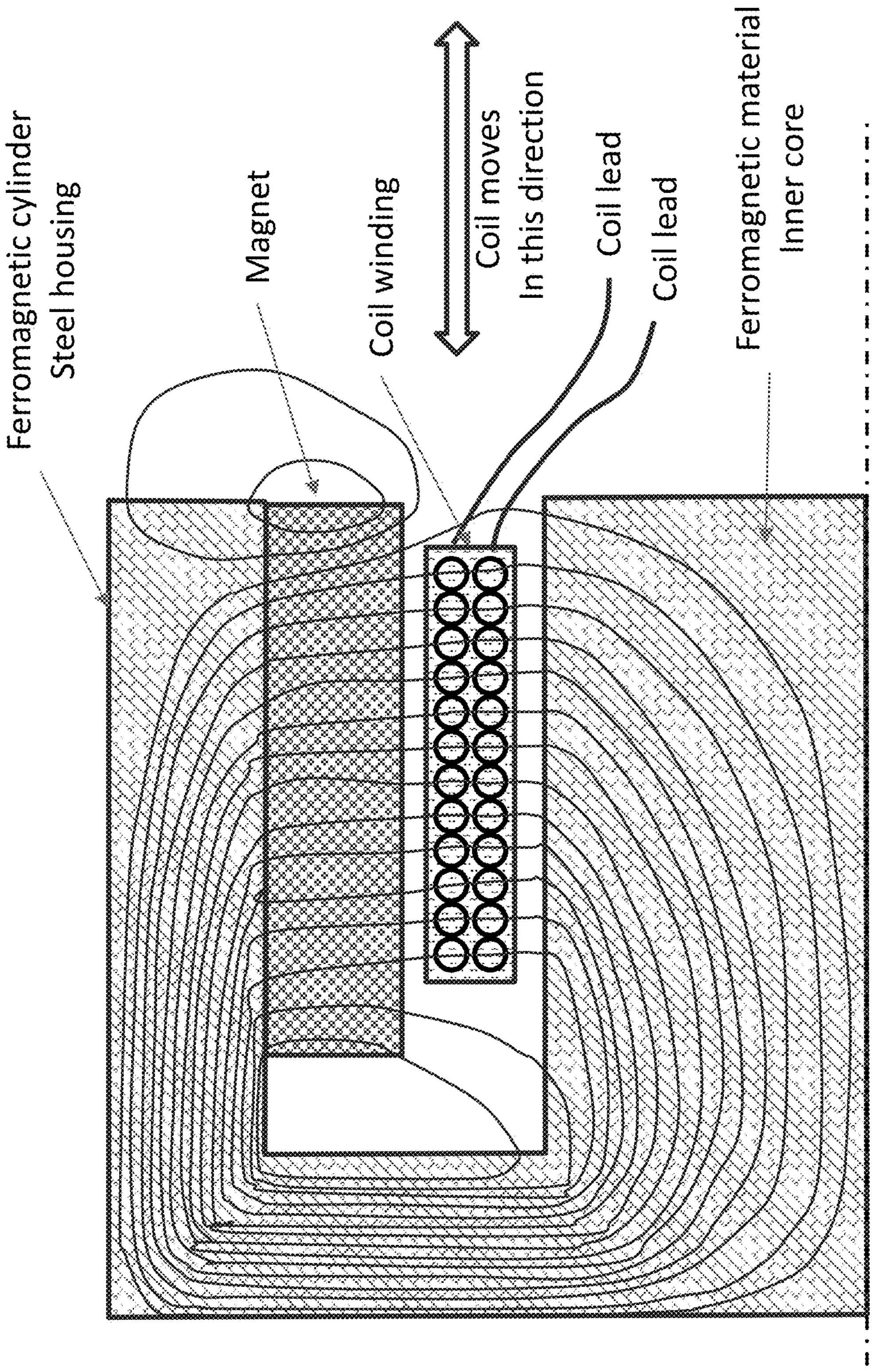
FIG. 2 shows the magnetic field interaction within a linear voice coil motor.

The description of illustrative embodiments according to principles of the present disclosure is intended to be read in connection with the accompanying drawings, which are to be considered part of the entire written description. In the description of embodiments of the disclosure disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the disclosure as presently contemplated. This description is not intended to be understood in a limiting sense, but provides an example of the disclosure presented solely for illustrative purposes by reference to the accompanying drawings to advise one of ordinary skill in the art of the advantages and construction of the disclosure. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

While some existing devices combine a bearing mechanism and one of the VCM's pole piece components, these devices utilize at least two independently manufactured components. This requires additional machining steps/components to mount the bearing mechanism to the pole piece components. They do not go as far as making the two items from a single, monolithic piece of material.

An embodiment of the present disclosure improves upon this approach due to the further space savings realized when the two (or more) components are replaced with a singular one. A reduced number of components results in better costs and allows for better tolerance control/device performance.

An embodiment of the present disclosure allows for the use of more readily available solid permanent magnets. The solid magnets improve the efficiency and power output of the motor due to improved magnetic field strength. An embodiment also allows for the use of a variety of high-performance bearing mechanisms such as a crossed roller bearing.

An embodiment of the present disclosure integrates the pole piece assembly of the motor within the primary bearing mechanism of the device in a singular piece of material. This approach allows for extremely compact motorized bearing assemblies and devices to be designed, due to the space savings achieved. The slight reduction in motor efficiency is compensated for by increasing the number of windings on the bobbin assembly within a portion of the recovered space. The extra conductive windings produce a stronger temporary magnetic field which boosts the force output of the motor, potentially beyond the strength of traditional designs within the same space. An embodiment can also be effectively utilized by applying a hard, wear-resistant coating to a variety of highly permeable soft iron materials. The benefit of this approach is two-fold; maximum motor efficiency and space savings can be simultaneously achieved through appropriate material and coating selection.

Unnecessary weight contributed by the mass of independent pole piece and bearing mechanism assemblies can be eliminated through the application of an embodiment of the present disclosure. Weight savings due to the reduced size and tightened confines of the bearing mechanism/pole piece components result in improved power-to-weight ratio of the device. This can compensate for some of the motor's efficiency losses when using a less magnetically conductive substrate, or in addition to a highly magnetically conductive substrate for maximum motor efficiency.

The monolithic design of the inner bearing raceway/pole piece assembly eliminates the need for several mechanical interfaces and potentially some mounting hardware vs. equivalent traditional designs. Precision bearing mechanisms such as a linear crossed roller, ball, or pneumatic guides, require tight tolerance control of the raceway's mating surface for optimal performance. Existing voice coil driven stages require the linear bearing's inner raceways to be mechanically connected to the pole piece assembly via the use of multiple mounting screws, adhesive, or interference fits. Alignment of the inner raceways is limited due to both the additional assembly process as well as the stacked manufacturing tolerances inherent to this approach. Assembly variables associated with the assembly of these critical bearing components also limit the potential performance of the overall mechanism due to uncontrollable alignment errors.

Figure 3:
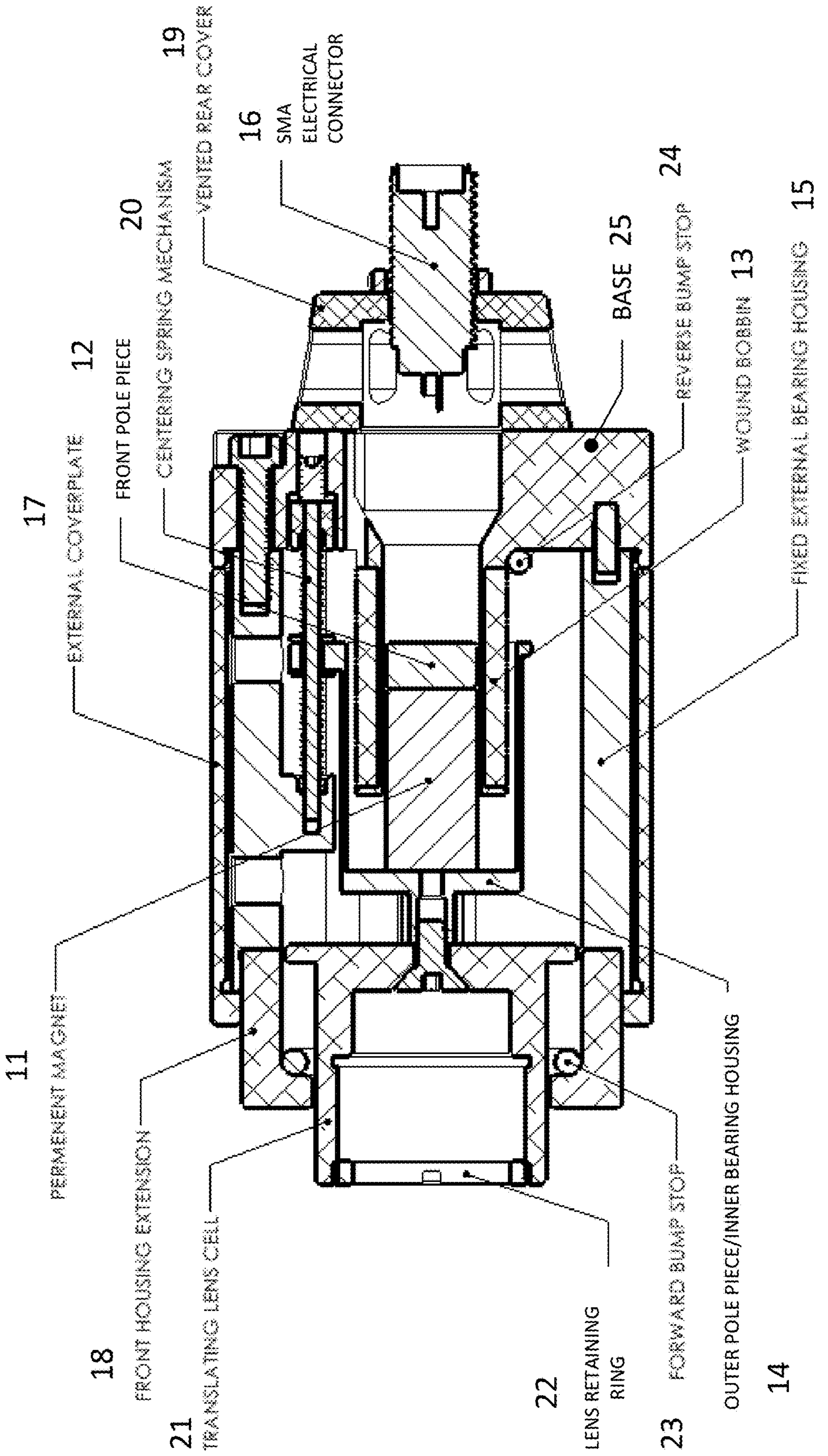
FIG. 3 shows a cross-sectional side view of a voice coil motor according to one embodiment of the present disclosure.
Figure 4:
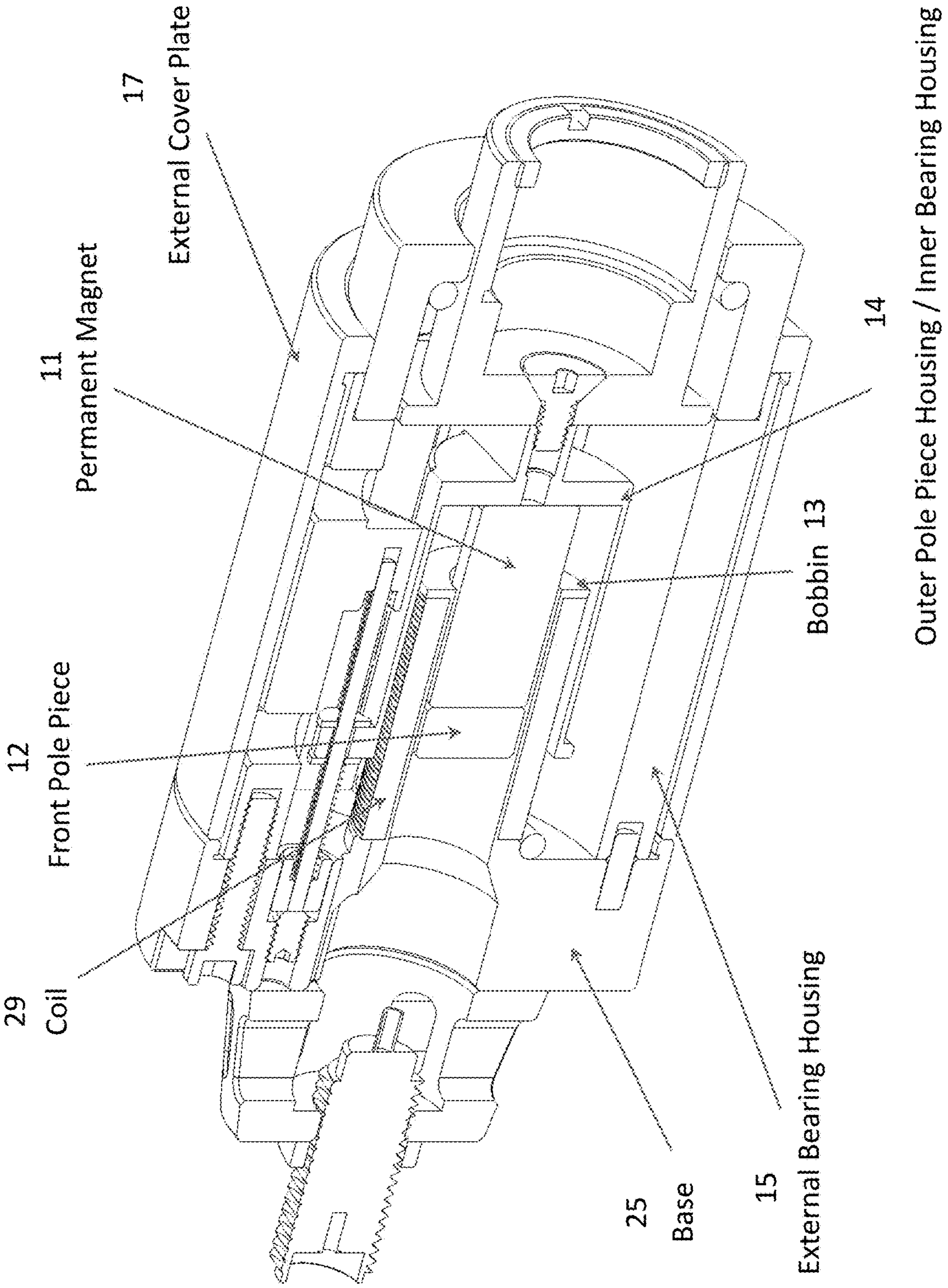
FIG. 4 shows a cross-sectional perspective view of a voice coil motor according to one embodiment of the present disclosure.
Figure 5:
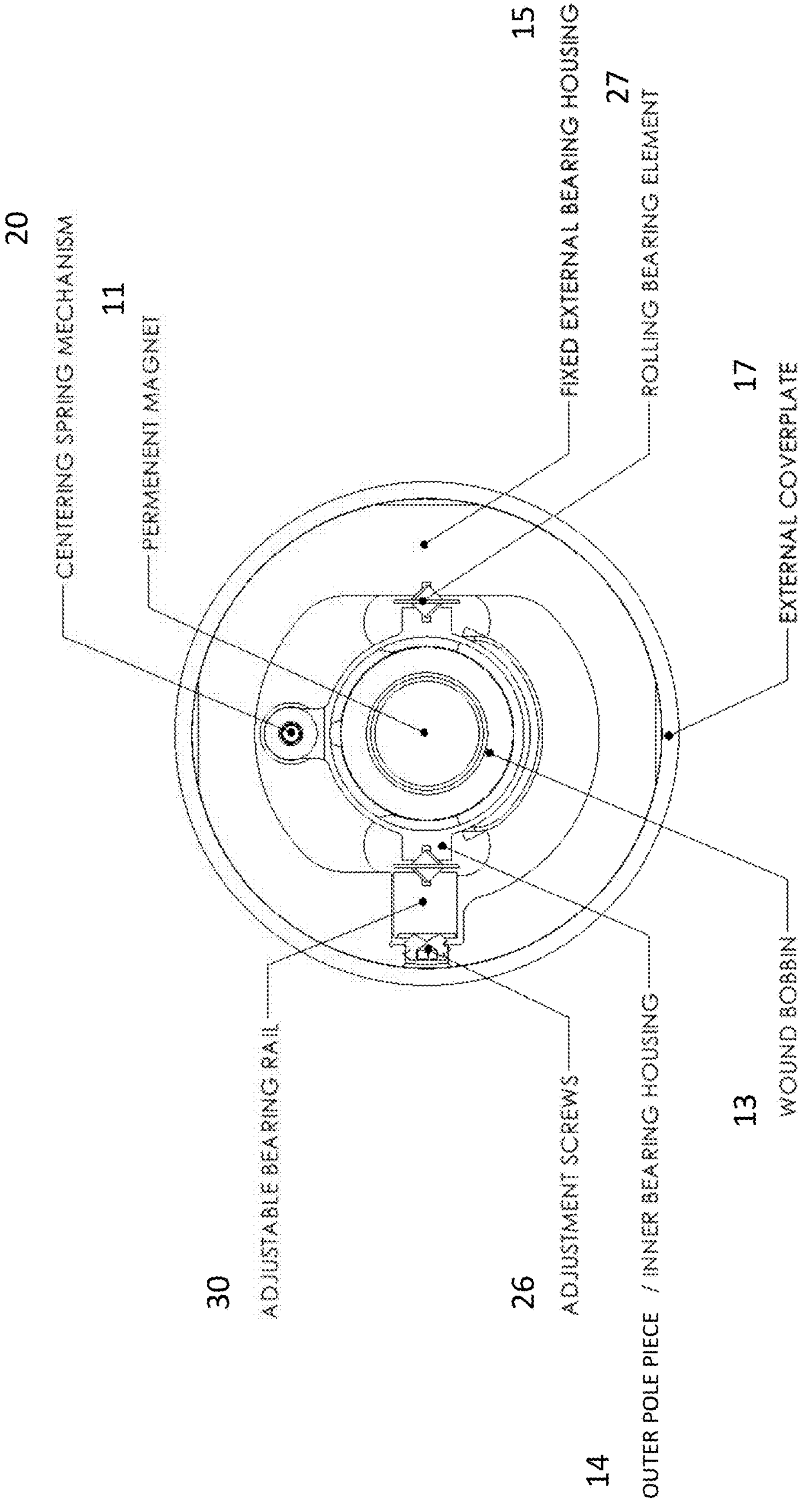
FIG. 5 shows a front view of a linear bearing mechanism according to one embodiment of the present disclosure.
Figure 6:
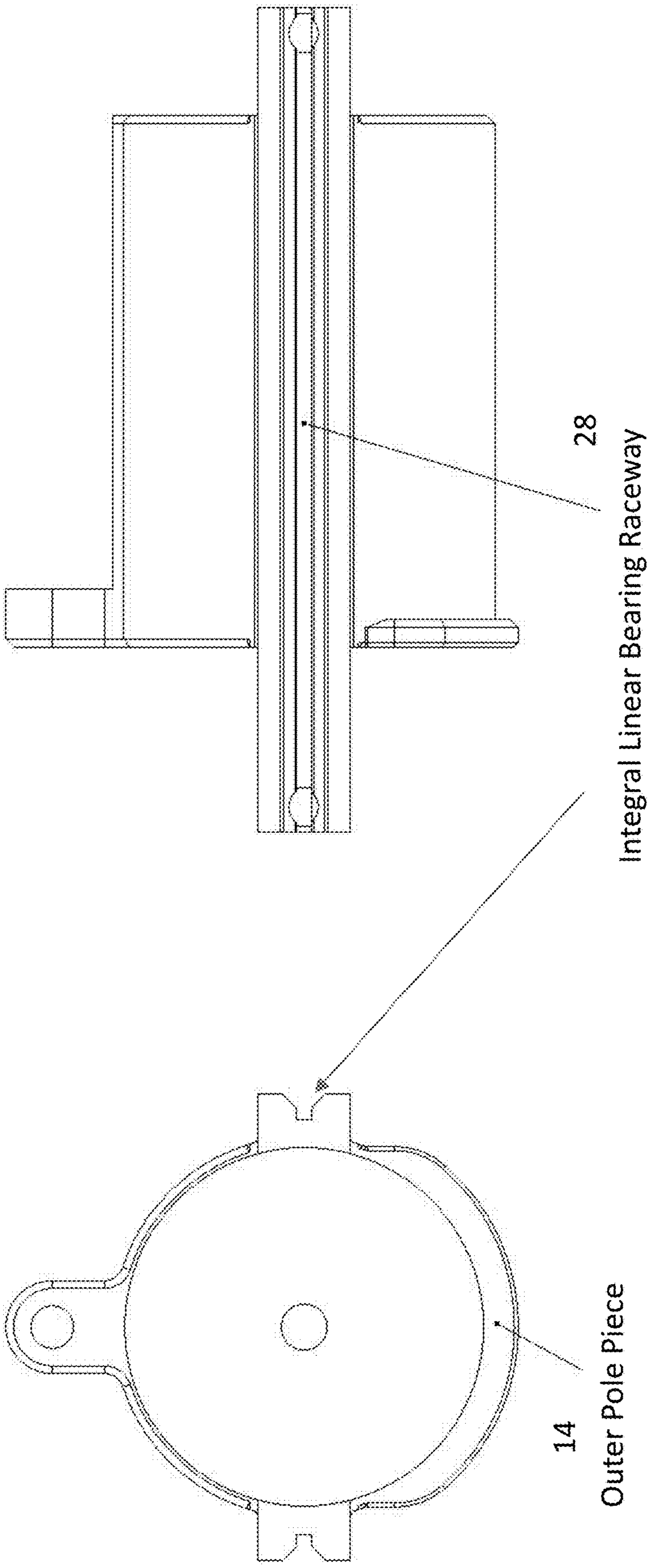
FIG. 6 shows a front view and a side view of an outer pole piece/inner bearing raceway component according to one embodiment of the present disclosure.
Figure 7:
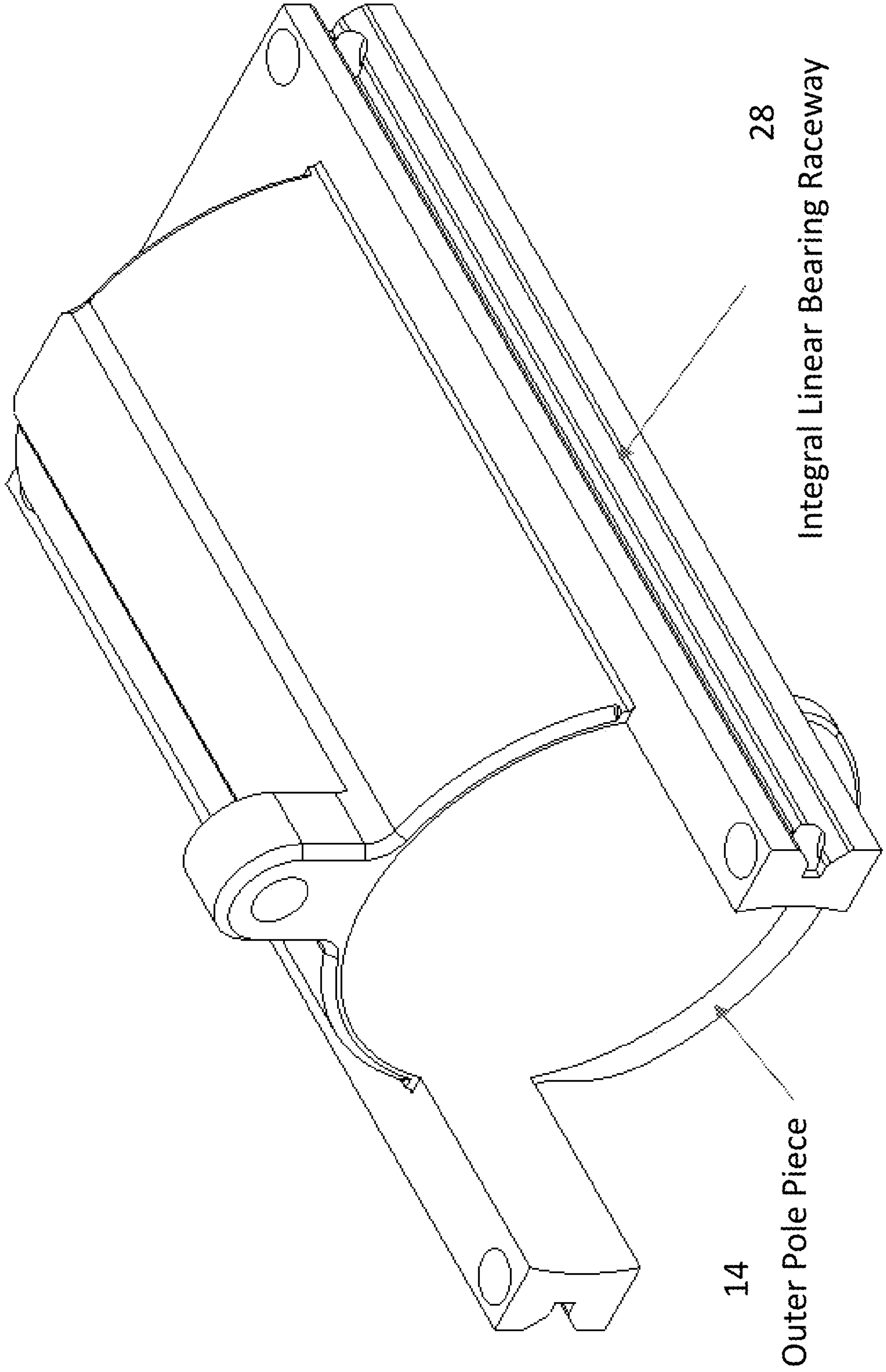
FIG. 7 shows a perspective view of an outer pole piece/inner bearing raceway component according to one embodiment of the present disclosure.

FIGS. 3-5 show varies views of an example voice coil motor structure according to an embodiment. FIGS. 6 and 7 show varies views of a monolithic outer pole piece housing/inner bearing housing structure according to an embodiment. In this example, the pole piece housing 14 is a cylindrical-shaped outer housing which houses a permanent magnet 11 and a voice coil 29. In the present example, one pole of a cylindrical magnet is attached to the inside closed end of the pole piece housing structure. The pole piece cylindrical shell together with the cylindrical magnet provides a concentrated magnetic field. Optionally, a front pole piece 12 is attached to the other pole of the cylindrical magnet to further enhance the magnetic flux path. A bobbin 13 supporting a winding of the coil 29 is arranged coaxially and situated concentric to the cylindrical magnet 12 and the outer pole piece housing 14. When an electrical currently is applied to the coil, the bobbin with the wound coil moves axially relative to the magnet, or the magnet moves axially relative to the coil. It is well known in the art that current may be supplied by an external source via an electrical connector (e.g., SMA connector 16) and lead wires to the coil. A first end of the bobbin that is outside of the pole piece housing can be fixed to a structure 25. Note that the use of cylindrical shapes for the magnet, coil, and housings in the present example embodiment is for illustrative purposes. It is understood that other geometric shapes are also contemplated in the present disclosure.

FIG. 5 shows a front view of an example linear bearing structure according to one embodiment. From the center going radially outward, the is a permanent magnet 11, a bobbin 13 supporting a wound coil, a monolithic structure including a pole piece housing 14 and a part of a linear bearing mechanism, an outer bearing housing 15, and an external coverplate 17. Also shown in FIG. 5 are adjustable bearing rail 30, adjustment screw 26 and rolling bearing element 27 that are parts of the linear bearing mechanism; and a centering spring mechanism 20 to resiliently bias the pole piece housing to a neutral position. As shown in FIGS. 6 and 7, the monolithic structure also serves as an inner bearing housing which includes one part of a linear bearing mechanism 28.

In this example, this one part of the linear bearing mechanism is integrated in the monolithic structure as a pair of linear bearing raceway 28 situated on opposite sides of the outer pole piece housing 14. It is understood that other equivalent linear bearing mechanisms are contemplated, and that they can be implemented by a person of ordinary skill in the art. A correspond part of the linear bearing mechanism is provided by an external bearing housing. The external bearing housing includes a pair of corresponding bearing rails arranged to engage the pair of linear bearing raceway of the monolithic structure, with rolling bearing elements 27 placed between the corresponding rails of the external bearing housing and the monolithic structure. In one embodiment, one of the bearing rails 30 in the external bearing housing is adjustable via adjustment screws 26.

As can be seen from FIGS. 3 and 4, the external bearing housing and the first end of the bobbin are attached to a common structure 25 (e.g., a rear housing) via glue, screws, etc. At the rear of the voice coil motor, there is a vented rear cover 19 and a SMA electrical connector 16 which provides an electric current to the coil. When an electric current is applied to the coil, the pole piece housing structure moves relative to the bobbin, external bearing housing and common structure. In one embodiment, where the common structure is held fixed by a stationary holder (for example, the voice coil motor includes mounting structure for securing to a laboratory workbench, optical table, etc.), the pole piece housing structure becomes the motion actuator. For example, the common structure 25 is a rear housing of the voice coil motor, and the voice coil motor is mounted to a laboratory workbench, or optical table, etc. The pole piece housing structure includes screw holes or mounting structure for attachment of an optic holder 21, 22 or actuator rod, etc., depending on the use of the voice coil motor. A front housing extension 18 may be included in the voice coil motor design.

Note that since the motion is relative, in another embodiment, the pole piece housing structure is held fixed by a stationary holder (for example, the pole piece housing includes mounting structure for securing to a laboratory workbench, optical table, etc.), and the common structure, external bearing housing or bobbin becomes the motion actuator. The common structure, external bearing housing or bobbin includes screw holes or mounting structure for attachment of an optic holder or actuator rod, etc., depending on the use of the voice coil motor.

In one embodiment, the voice coil motor includes one or more bump stops (e.g., forward bump stop 23, reverse bump stop 24) configured to limit the range of motion.

An embodiment of the present disclosure circumvents all of above discussed issues due to the monolithic arrangement of the previously separate components. The potential elimination of several mounting hardware components, reduced mechanical interfaces, and a simplified assembly process, results in the potential for improved production costs and purer motion.

Improved mechanical coupling accuracy of the axis of force output with the axis of motion provided by the bearing mechanism is an additional benefit of an embodiment of the present disclosure. Manufacturing tolerances relevant to optimal device performance can be more tightly specified and achieved through the application of the proposed embodiments due to the monolithic manufacturing approach.

An embodiment of the present disclosure offers numerous unique advantages or benefits that practitioners in the art may be interested in utilizing along with a component cost savings. The most obvious benefit would be the space savings offered by the monolithic pole piece/bearing raceway configuration. Other benefits include the improved coupling accuracy, improved electromechanical efficiency, lower costs, and the weight reduction of the moving world.

While the present disclosure describes at some length and with some particularity with respect to the several described embodiments, it is not intended that it should be limited to any such particulars or embodiments or any particular embodiment, but it is to be construed so as to provide the broadest possible interpretation in view of the related art and, therefore, to effectively encompass various embodiments herein. Furthermore, the foregoing describes various embodiments foreseen by the inventor for which an enabling description was available, notwithstanding those modifications of the disclosure, not presently foreseen, may nonetheless represent equivalents thereto.

The invention claimed is:

1. A voice coil motor comprising:

a magnet;

a coil;

a bobbin configured to support a winding of the coil, the bobbin being arranged coaxially with an axis of the magnet and radially outside of the magnet;

a bearing housing comprising a first part of a linear bearing mechanism; and a monolithic structure comprising a pole piece housing and a second part of the linear bearing mechanism;

wherein the pole piece housing comprises a first end, a second end and a sidewall, the sidewall of the pole piece housing is arranged coaxially with and radially outside of the bobbin;

wherein the pole piece housing and the bearing housing are arranged to cause the first and second parts of the linear bearing mechanism to engage such that when a current is applied to the coil, the pole piece housing moves relative to the bearing housing, and wherein the first and second parts of the linear bearing mechanism are disposed outside each of the pole piece housing and the magnet.

2. The voice coil motor of claim 1, wherein the first end of the pole piece housing is attached to a first pole of the magnet to provide a concentrated magnetic field, and wherein the bearing housing and an end of the bobbin that faces away from the first end of the pole piece housing are fixed relative to a common structure, and the pole piece housing is configured to move relative to the common structure.

3. The voice coil motor of claim 2, further comprising a front pole piece attached to a second pole of the magnet to enhance the magnetic field.

4. The voice coil motor of claim 1, further comprising an electrical connector configured to provide the current from an external source.

5. The voice coil motor of claim 2, wherein the pole piece housing further comprises a mounting portion configured for connecting the pole piece housing to an optic holder or an actuator rod.

6. The voice coil motor of claim 5, wherein the common structure, bearing housing or bobbin comprises a mounting portion configured for fixing to a stationary holder.

7. The voice coil motor of claim 2, wherein the bearing housing further comprises a mounting portion configured for fixing the bearing housing to a motor holder.

8. The voice coil motor of claim 7, wherein the common structure, bearing housing or bobbin comprises a mounting portion for connecting to an optic holder or actuator rod.

9. The voice coil motor of claim 7, further comprising one or more bump stops configured to limit the range of motion of the voice coil motor.

10. The voice coil motor of claim 1, wherein the pole piece housing is made of a soft iron material coated with a hard, wear-resistant material.

11. The voice coil motor of claim 1, wherein the pole piece housing is disposed in the bearing housing.

12. The voice coil motor of claim 1, wherein the first end is a fully closed end.

13. The voice coil motor of claim 1, wherein the pole piece housing and the second part of the linear bearing mechanism are integrally formed from a same material.

14. A voice coil motor comprising:

a magnet;

a coil;

a bobbin configured to support a winding of the coil, the bobbin being arranged coaxially with an axis of the magnet and radially outside of the magnet;

a bearing housing comprising a first part of a linear bearing mechanism; and a monolithic structure comprising a pole piece housing and a second part of the linear bearing mechanism;

wherein the pole piece housing comprises a first end, a second end and a sidewall, the sidewall of the pole piece housing is arranged coaxially with and radially outside of the bobbin;

wherein the pole piece housing and the bearing housing are arranged to cause the first and second parts of the linear bearing mechanism to engage such that when a current is applied to the coil, the pole piece housing moves relative to the bearing housing; and wherein the second part of the linear bearing mechanism is greater, in length in a direction in which the axis of the magnet extends, than the pole piece housing.

15. A voice coil motor comprising:

a magnet;

a coil;

a bobbin configured to support a winding of the coil, the bobbin being arranged coaxially with an axis of the magnet and radially outside of the magnet;

a bearing housing comprising a first part of a linear bearing mechanism; and a monolithic structure comprising a pole piece housing and a second part of the linear bearing mechanism;

wherein the pole piece housing comprises a first end, a second end and a sidewall, the sidewall of the pole piece housing is arranged coaxially with and radially outside of the bobbin;

wherein the pole piece housing and the bearing housing are arranged to cause the first and second parts of the linear bearing mechanism to engage such that when a current is applied to the coil, the pole piece housing moves relative to the bearing housing; and wherein the pole piece housing comprises an outer wall facing away from the side wall of the pole piece housing, and the second part of the linear bearing mechanism includes a surface continuously connected to the outer wall of the pole piece housing.

* * * * *